United States Patent
Thomas et al.

(10) Patent No.: US 8,684,408 B2
(45) Date of Patent: Apr. 1, 2014

(54) SIDE IMPACT AIRBAG CUSHION

(75) Inventors: Scott D. Thomas, Novi, MI (US);
Richard Wiik, Fort Gratiot, MI (US)

(73) Assignees: GM Global Technology Operations LLC, Detroit, MI (US); TK Holdings Inc., Auburn Hills, MI (US)

( * ) Notice: Subject to any disclaimer, the term of this patent is extended or adjusted under 35 U.S.C. 154(b) by 242 days.

(21) Appl. No.: 13/244,354

(22) Filed: Sep. 24, 2011

(65) Prior Publication Data
US 2013/0076014 A1  Mar. 28, 2013

(51) Int. Cl.
*B60R 21/207* (2006.01)
*B60R 21/216* (2011.01)

(52) U.S. Cl.
USPC .............. 280/743.2; 280/743.1; 280/730.2; 280/740

(58) Field of Classification Search
USPC .............. 280/743.2, 730.2, 740, 743.1
See application file for complete search history.

(56) References Cited

U.S. PATENT DOCUMENTS

| | | | | |
|---|---|---|---|---|
| 5,593,179 A * | 1/1997 | Maruyama | | 280/740 |
| 5,636,862 A * | 6/1997 | Cheung et al. | | 280/730.2 |
| 7,347,444 B2 * | 3/2008 | Wheelwright | | 280/729 |
| 7,549,672 B2 * | 6/2009 | Sato et al. | | 280/730.2 |
| 7,611,164 B2 * | 11/2009 | Kai et al. | | 280/729 |
| 7,614,650 B2 * | 11/2009 | Yokota | | 280/730.2 |
| 7,753,407 B2 * | 7/2010 | Yokota | | 280/743.2 |
| 7,766,379 B2 * | 8/2010 | Dix et al. | | 280/730.2 |
| 7,793,973 B2 * | 9/2010 | Sato et al. | | 280/730.2 |
| 7,819,419 B2 * | 10/2010 | Hayashi et al. | | 280/730.1 |
| 7,997,614 B2 * | 8/2011 | Ishikawa et al. | | 280/739 |
| 8,297,649 B2 * | 10/2012 | Enders | | 280/730.1 |
| 8,360,469 B2 * | 1/2013 | Wiik et al. | | 280/743.2 |
| 8,419,060 B2 * | 4/2013 | Yamamoto et al. | | 280/743.2 |
| 2005/0206138 A1 * | 9/2005 | Breuninger et al. | | 280/729 |
| 2006/0119083 A1 * | 6/2006 | Peng et al. | | 280/730.2 |
| 2009/0014990 A1 * | 1/2009 | Loibl et al. | | 280/730.2 |
| 2010/0181749 A1 * | 7/2010 | Sugimoto | | 280/743.2 |
| 2010/0270782 A1 * | 10/2010 | Enders et al. | | 280/743.2 |
| 2012/0038137 A1 * | 2/2012 | Wipasuramonton et al. | | 280/733 |
| 2012/0091697 A1 * | 4/2012 | Wiik et al. | | 280/730.2 |

* cited by examiner

*Primary Examiner* — Drew Brown

(57) ABSTRACT

A side impact airbag cushion for mounting on a seat in a motor vehicle includes an occupant facing panel and a panel opposite the occupant facing panel, and a mounting portion mounted on the seat back. A cushion upper half portion is positioned near the occupant head, and a cushion lower half lower portion is positioned adjacent the occupant torso and has a central unfilled region surrounded by a tubular inflated ring that extends toward the occupant from the central unfilled region. The cushion upper half portion has a tubular inflated pillow region that extends toward the occupant further than the tubular inflated ring surrounding the central unfilled region, to thereby provide an enlarged pillow surface for supporting the occupant head. An upper tether attached to the cushion is shorter in length than the cushion so that the tether rotates the cushion upper half portion toward the occupant head.

20 Claims, 3 Drawing Sheets

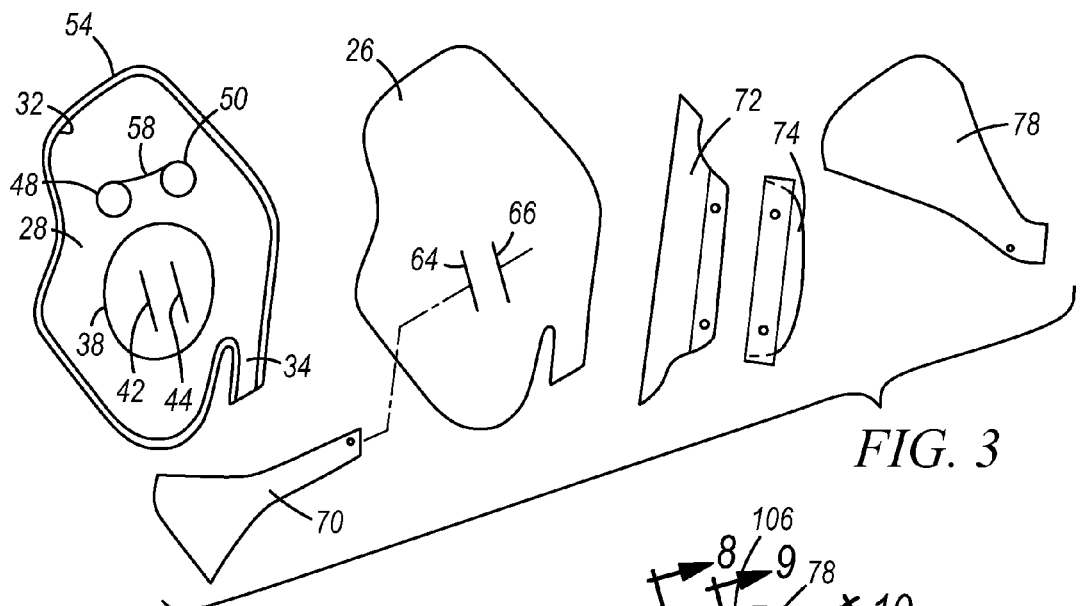
FIG. 3
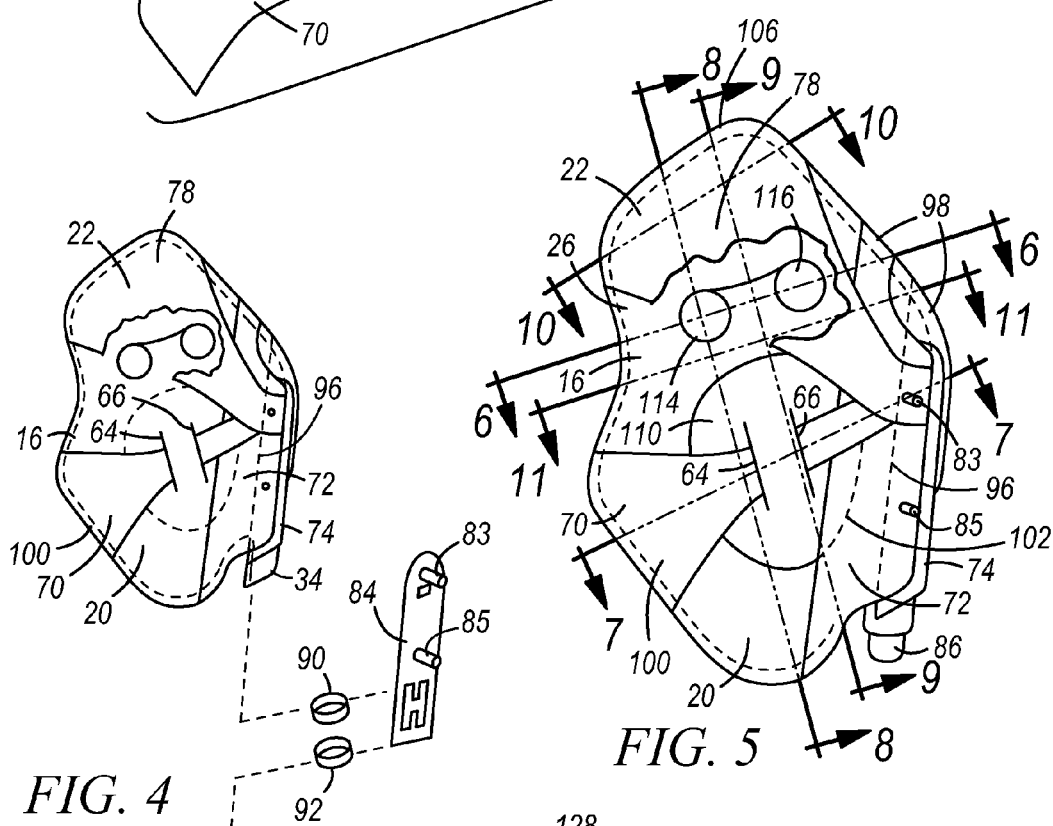
FIG. 4
FIG. 5
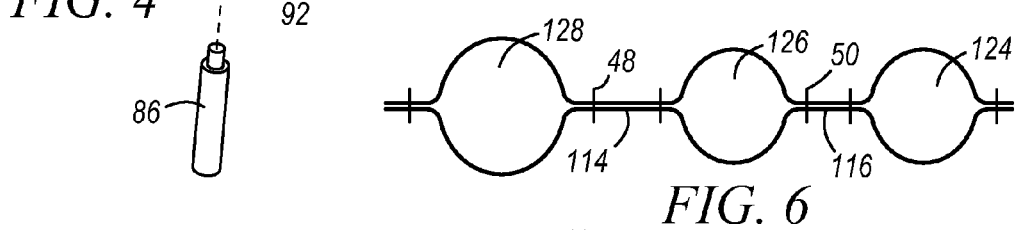
FIG. 6
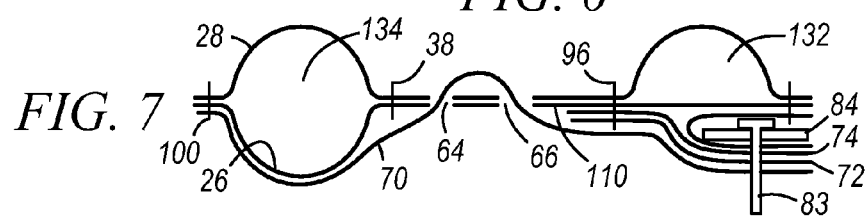
FIG. 7

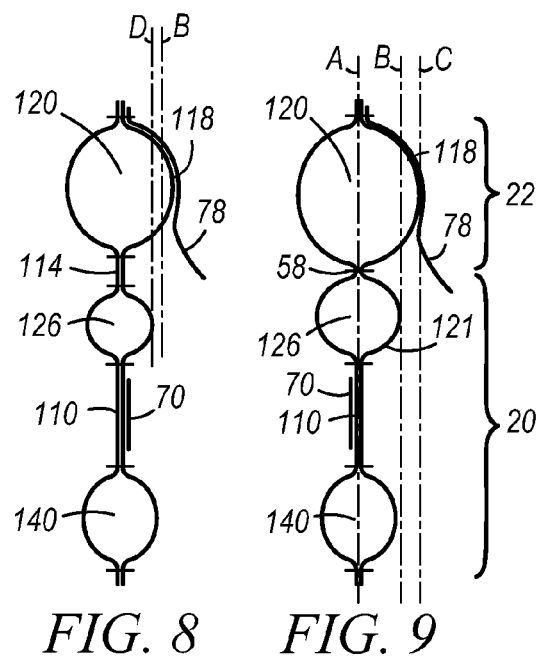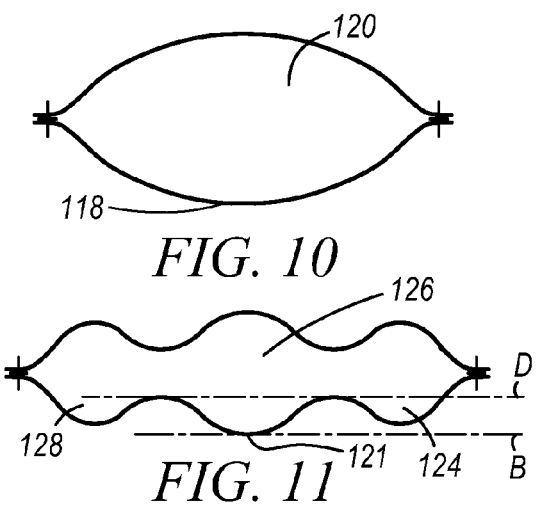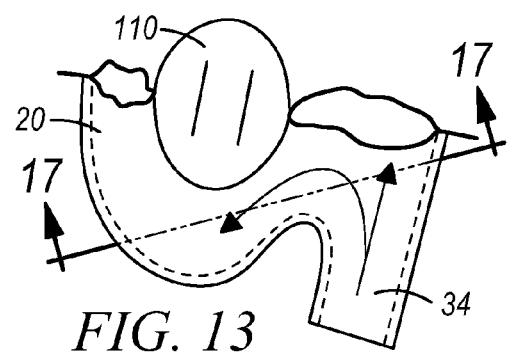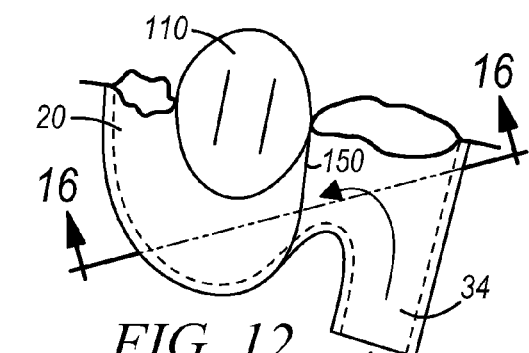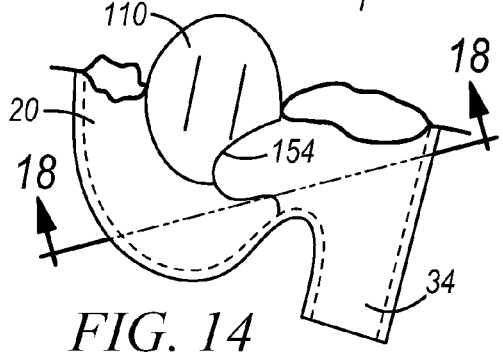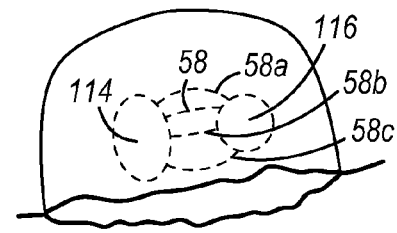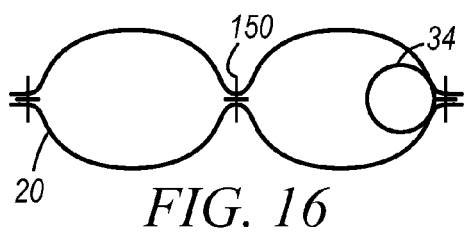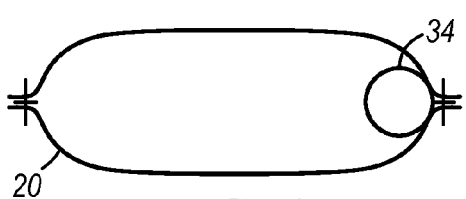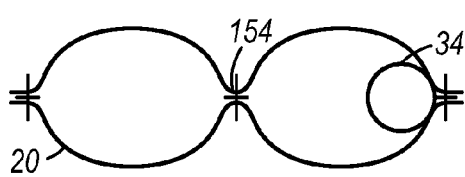

SIDE IMPACT AIRBAG CUSHION

FIELD OF THE INVENTION

The present invention relates to an occupant restraining airbag in a motor vehicle and more particularly an airbag cushion mounted inboard of the vehicle seat to provide side impact restraint of the occupant.

BACKGROUND OF THE INVENTION

It is known in motor vehicles to provide an inflatable airbag having a cushion for restraining an occupant. It has been proposed to mount an airbag on the inboard side of a vehicle seat in order to restrain the occupant against movement sideways within the vehicle and provide cushioning between the occupant and other interior objects.

It would be desirable to provide an improved airbag cushion which would provide improved restraint of the occupant against movement sideways within the vehicle and improved cushioning capability.

SUMMARY OF THE INVENTION

A side impact airbag cushion for mounting on a seat in a motor vehicle includes an occupant facing panel and a panel opposite the occupant facing panel, and a mounting portion mounted on the seat back. A cushion upper half portion is positioned near the occupant head, and a cushion lower half portion is positioned adjacent the occupant torso and has a central unfilled region surrounded by a tubular inflated ring that extends toward the occupant from the central unfilled region. The cushion upper half portion has a tubular inflated pillow region that extends toward the occupant further than the tubular inflated ring surrounding the central unfilled region, to thereby provide an enlarged pillow surface for supporting the occupant head. An upper tether is attached to the cushion upper half portion which is shorter in length than the cushion panels so that the tether rotates the cushion upper half portion toward the occupant head.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawings, wherein:

FIG. 3 is an exploded view showing the panels of flexible material that will be attached together to create the cushion.

FIG. 4 shows the panels of flexible material of FIG. 3 attached together, and an inflator, diffuser, and mounting bracket ready to be assembled.

FIG. 5 is a view of the side of the assembled cushion facing the occupant.

FIG. 6 is a section view taken in the direction of arrows 6-6 of FIG. 5.

FIG. 7 is a section view taken in the direction of arrows 7-7 of FIG. 5.

FIG. 8 is a section view taken in the direction of arrows 8-8 of FIG. 5.

FIG. 9 is a section view taken in the direction of arrows 9-9 of FIG. 5.

FIG. 10 is a section view taken in the direction of arrows 10-10 of FIG. 5.

FIG. 11 is a section view taken in the direction of arrows 11-11 of FIG. 5.

FIG. 12 is a fragment of the lower portion of the cushion showing the route of flow of the inflation gas.

FIG. 13 is another fragment of the lower portion of the cushion showing an alternative route of flow for the inflation gas.

FIG. 14 is yet another fragment of the lower portion of the cushion showing an alternative route of flow for the inflation gas.

FIG. 15 is a fragment of the upper portion of the cushion showing alternatives for the shape of first and second unfilled regions.

FIG. 16 is a section view taken in the direction of arrows 16-16 of FIG. 12.

FIG. 17 is a section view taken in the direction of arrows 17-17 of FIG. 13.

FIG. 18 is a section view taken in the direction of arrows 18-18 of FIG. 14.

DESCRIPTION OF EXEMPLARY EMBODIMENTS

Figure 1:
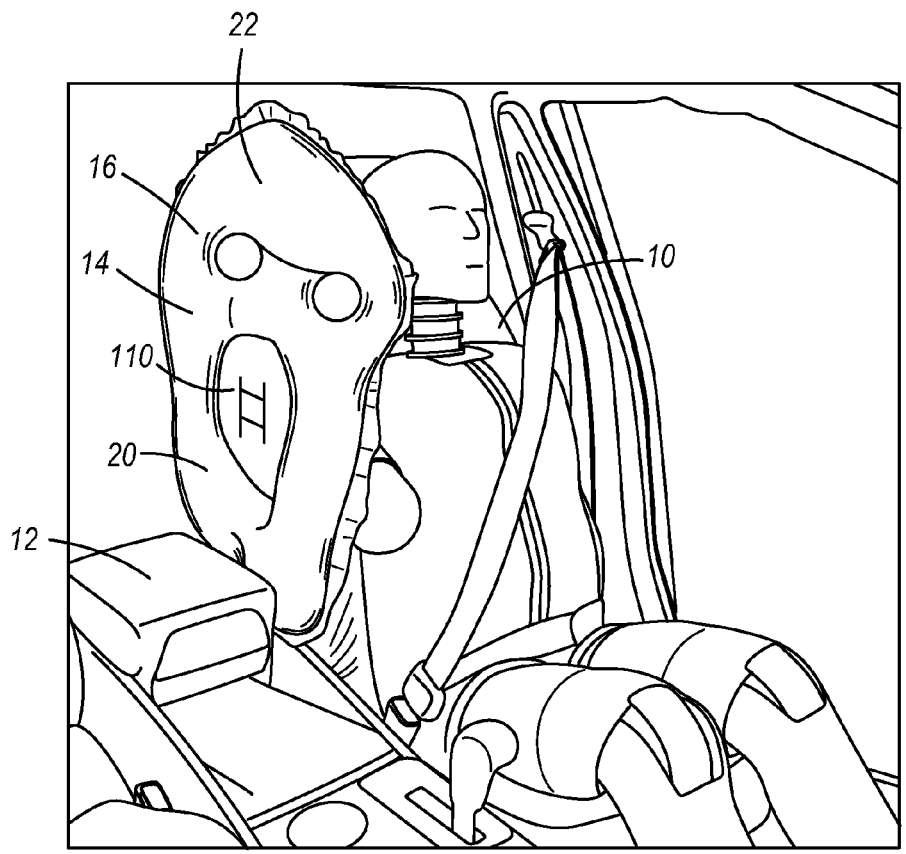
FIG. 1 is a perspective view of an airbag cushion inflated between a driver and a console.
Figure 2:
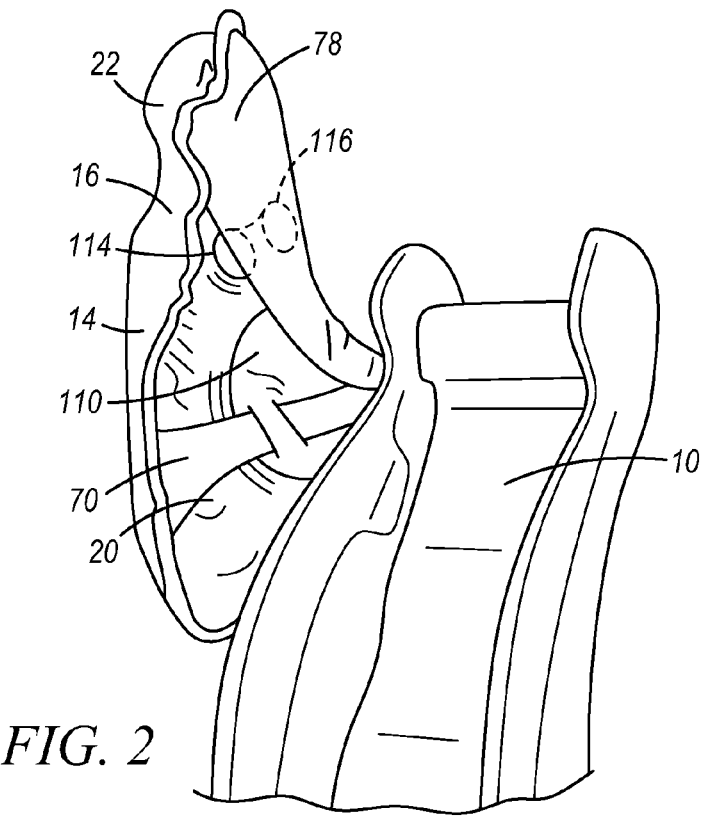
FIG. 2 is another perspective view of the airbag cushion of FIG. 1.

Referring to FIG. 1, a vehicle occupant, particularly the driver, is seated in a vehicle seat 10. The seat may have an armrest, not shown. A storage console 12 is mounted on the vehicle body inboard the vehicle seat 10 and the occupant. An airbag system 14 is mounted on the inboard side of the vehicle seat 10 and includes a cushion 16 which is shown in its inflated condition in FIGS. 1 and 2. As seen in FIG. 1, the cushion 16 includes a cushion lower half portion 20 generally adjacent the occupant torso and a cushion upper half portion 22 adjacent the occupant head.

Components of the Cushion and Inflator

FIG. 3 shows the various panels of flexible but generally unstretchable material from which the cushion 16 will be assembled. Occupant facing panel 26 will face the occupant of FIG. 1. An opposite facing panel 28 will face away from the occupant of FIG. 1. The flexible material of the occupant facing panel 26 and the opposite facing panel 28 is tightly woven and coated to prevent the leakage of inflation gas through the material. A peripheral bead of sealant 32, such as silicone sealant, is deposited all along the peripheral edge of the opposite facing panel 28, except at a tail or inlet 34 which will become the inlet for an airbag inflator. The sealant 32 will prevent the leakage of inflation gas through the seams between the occupant facing panel 26 and the opposite facing panel 28. A relatively large diameter encirclement 38 of the sealant is provided on the opposite facing panel 28 generally adjacent the occupant torso and shoulder. Slits 42 and 44 are cut in the opposite facing panel 28. Encirclements 48 and 50 of sealant are provided above the encirclement 38 and below an upper edge portion 54 of the opposite facing panel 28, as seen in FIG. 3. In addition, an optional row or line 58 of sealant is provided that connects together the encirclements 48 and 50.

The occupant facing panel 26 is shaped to overlie the opposite facing panel 28 and has slits 64 and 66 that will overlie the slits 42 and 44. The occupant facing panel 26 will be placed atop the opposite facing panel 28, as shown in FIG. 4, and become bonded thereto by the various beads and encirclements of sealant. A conventional row of stitches is provided all around the peripheral edges between the occupant facing panel 26 and opposite facing panel 28. In addition, the encirclements 38, 48, and 50, and the row 58 are traced with a row of sewn stitches to provide additional attachment between the occupant facing panel 26 and the opposite facing panel 28.

Additional panels of flexible material, shown in FIG. 3, include a lower tether 70, a pair of cushion mounting flaps 72 and 74, and an upper tether 78.

Assembly of the Components

FIG. 4 shows the various panels of cushion material of FIG. 3 fully attached together to provide the completed cushion 16. In addition, FIG. 4 shows a mounting bracket 84 with mounting bolts 83 and 85 that will bolt to the seat back. FIG. 4 also shows an inflator 86, and mounting bands 90 and 92 that will connect together the mounting bracket 84, inflator 86, and the cushion tail 34. FIG. 5 shows the mounting bracket 84 and inflator 86, assembled together within the cushion 16. The cushion mounting flaps 72 and 74 are sewn together at stitch line 96 and are sewn to the occupant facing panel 26 in the opposite facing panel 28 at a location at outer perimeter stitch line 98 and at a location at an inner ring stitch line 102. The stitch lines 96 and 102 attaching the cushion mounting flaps 72, 74 are sewn through the uninflated regions of the cushion. The mounting bolts 83 and 85 are projecting outwardly and ready to be installed through bolt apertures in the vehicle seat back.

As seen in FIGS. 5 and 7, the lower tether 70 is situated on the occupant facing panel 26 of the cushion 16 and has its rearward end sewn into the stitch line 96 and also anchored on the mounting bolt 83. The forward end of the lower tether 70 is sewn to the cushion lower half portion 20 at the forwardmost peripheral edge region 100 of the cushion lower half portion 20. In addition, an intermediate portion of the tether 70 is passing through the slits 64 and 66 and slits 42, 44. The lower tether 70 is constructed in a length that is shorter than the distance between its end attachments to the cushion 16 so that when the cushion 16 is inflated, the lower tether 70 curves the cushion 16 toward the occupant.

As seen in FIGS. 5, 8, and 9, the upper tether 78 has one end sewn into the stitch line 96 and anchored on the mounting bolt 83 and the other end sewn to the cushion upper half portion 22 at an upper peripheral edge region 106 of the cushion 16. As seen in FIG. 5, this sewing of the upper tether 78 preferably occurs around both the uppermost edge and the upper forward corner of the cushion upper half portion 22 so that the upper tether 78 is extending diagonally rearward from the upper airbag portion to the mounting bolt 83. The upper tether 78 is constructed in a length that is shorter than the distance between its end attachments to the cushion 16 so that when the cushion 16 is inflated, the upper tether 78 curves the cushion 16 toward the occupant.

Inflation of the Cushion and Restraint of the Occupant

FIGS. 1, 2, and 5-11 show the inflated cushion 16 at its normal occupant restraining condition to which it has been inflated and deployed by an activation of the inflator 86. The use of leak resistant flexible material for the cushion panels 26 and 28, and the use of a sealant to seal the peripheral seams and seal the encirclements 38, 48, 50, and the row 58 of attachments of the airbag cushion 16, result in a cushion 16 that has a very low rate of leakage to the atmosphere so that the cushion 16 is capable of remaining inflated for an extended period of time. The lower tether 70 and the upper tether 78 cooperate to retain the inflated airbag cushion 16 in position relative the seat back so that the inflated cushion 16 will resist movement of the occupant in the inboard direction.

The lower encirclement 38 of sealant, together with the row of stitching around the encirclement 38, create a relatively large unfilled region 110 of cushion 16 where the sealant prevents the inflation gas from reaching. This unfilled region 110 generally aligns with and receives the occupant upper torso and shoulder. This unfilled region 110 is shown in the sectional views of FIGS. 7, 8, and 9.

The two smaller upper encirclements of silicone 48 and 50 define unfilled regions 114 and 116 where the inflation gas cannot reach. In addition, the optional row 58 of sealant, and the accompanying optional stitches that extend between the encirclements 48 and 50, create a line of connection between the unfilled regions 114 and 116.

Referring to FIGS. 8, 9, and 10, an enlarged pillow surface 118 is provided by an enlarged bulbous filled region 120 that is situated above and defined by, the upper unfilled regions 114 and 116 and the optional line of connection 58. In FIG. 9, it is seen that this pillow surface 118 and the enlarged bulbous filled region 120 constitutes the cushion upper half portion 22, while the remainder of the cushion 16 below the pillow surface 118 and the unfilled regions 114 and 116 that form it, constitute the cushion lower half portion 20 which is in the form of a tubular inflated ring that surrounds the unfilled region 110. As seen in FIG. 9, when viewed in vertical section, the cushion lower half portion 20 has the unfilled region 110 positioned at the vertical plane designated "A", and filled regions 124 and 126 generally reaching out to the vertical plane designated "B". The large pillow surface 118 of the upper cushion half portion reaches out in the direction of the occupant's head to the vertical plane designated "C".

As seen in FIGS. 9 and 11, the part of the filled region 126 that is below and between the unfilled regions 114, 116 and the unfilled region 110 of the cushion lower half portion 20 provides a secondary pillow surface 121 that will also support the tether 78 if contacted thereby. When viewed in vertical section, the second bulbous filled region 121 extends to the plane identified as "B". This secondary pillow surface 121 extends out further than the adjacent parts of the filled regions 124, 126, and 128 to the plane identified as "D".

Upon inflation of the cushion 16, a sideways movement of the occupant toward the cushion will result in the upper torso being received in the unfilled region 110, and the occupant head will be supported by contact with the tether 78, while the tether 78 is in turn supported by the bulbous shape of the pillow surface 118 that is underlying the upper end of the tether 78. The length of upper tether 78, helped by any occupant restraint load imposed on the upper tether 78, will rotate the upper half portion 22 of the inflated cushion 16 in the direction toward the occupant head. Simultaneously, the lower tether 70 is tensioned, and will tend to rotate the cushion lower half portion 20 of the inflated cushion 16 in the direction toward the occupant. If needed, the secondary pillow surface 121 can also provide support to the tether 78. As seen in FIG. 1, cushion lower half portion 20 can be located below the console 12 so that the console 12 is also supporting the inflated cushion 16.

Tuning the Performance of the Cushion

It will be understood that the provision of the lower unfilled region 110, the pair of upper unfilled regions 114 and 116, and the line of connection 58 provide a distinctively shaped cushion 16 that can be tuned to provide optimal restraint to a seated occupant. The diameter and shape of the smaller unfilled regions 114 and 116 can be varied in order to define the size and shape of the filled region 120, and accordingly define the shape of the pillow surface 118. For example, FIG. 15 shows various alternative paths for the line of connection between the small unfilled regions 114 and 116. The connection line 58 is straight and extends between the unfilled regions 114 and 116 at about the upper ends of the unfilled regions 114 and 116. Connection line 58a extends between the unfilled regions 114 and 116 but is curved upwardly. Connection line 58b is straight and provided at the centerline of the unfilled regions 114 and 116. Connection line 58c is curved downwardly. Thus, there are many alternative positions for the row 58 of the attachments extending between the encirclements 48 and 50 that define unfilled regions 114 and 116 to further tune the shape and dimensions of the enlarged pillow surface 118 provided by the filled region 120. In addition, FIG. 15 also shows that the small unfilled regions 114 and 116 are not limited to being circular in shape. For example, in FIG. 15 the encirclement that provides the unfilled region 114 is shown as having a pill or oblong shape. Accordingly, the size and shape of the pillow surface 118 and the second bulbous filled portion 121 can be made relatively bulbous and spherical or ellipsoidal in shape by adjusting the size, shape, and location of the unfilled regions 114 and 116 and the row of attachments 58.

In the section view of FIG. 6, we see that unfilled region 114 is situated between a center filled region 126 and a forward filled region 128. In addition, the unfilled region 116 is situated between the center filled region 126 and a rear filled region 124. In FIG. 6, the diameter of the forward filled region 128 is greater than the diameter of the rear filled region 124. By varying the size of the encirclements 48 and 50 that defined the unfilled regions 114 and 116, we can control and tune the sizes of each of these filled regions 124, 126, and 128. Likewise, as seen in FIG. 7, by controlling the size of the encirclement 38 that defines the unfilled region 110, we can precisely determine the size and location of the filled regions 132 and 134 that are respectively rearward and forward of the unfilled region 110. In addition, as viewed in FIGS. 8, 9 and 11, the size and location of the encirclements 48 and 50 and the size of the unfilled region 110 will determine the relative size of the filled region 126 and 140 located respectively above and below the unfilled region 110.

Referring again to FIGS. 2, 5, 8, and 9, it will be seen that the upper tether 78 stretches from the uppermost peripheral edge 106 of the inflated cushion 16, downwardly and diagonally rearward across the unfilled regions 114 and 116 and the optional row 58 so that the upper tether completely or partially covers at least one of these upper encirclements 114, 115 and the row 58. In addition, the upper tether 78 is tensioned and is stretching just above the occupant shoulder so that the contact between the cushion 16 and the occupant head will be via contact with this tether 78, rather than contact with the unfilled regions 114 and 116 that help to define the shape of the pillow provided by the filled region 120. Thus, the upper tether 78 will act as a membrane external to the inflated cushion 16 and will limit lateral occupant head motion into the unfilled regions 114, 116 and optional row 58 of the cushion.

Controlling the Cushion Inflation

FIGS. 12, 13, and 14, and their respective section views shown in FIGS. 16, 17, and 18, show alternative arrangements for sequencing the inflation of the cushion 16. In FIG. 12, a line of sewn stitching or sealant 150 is provided between the occupant facing panel 26 and the opposite facing panel 28 so that the inflator gas flow will proceed to flow up the rearward part of the cushion 16, and around the unfilled region 110, so that the cushion upper half portion 22 of the cushion 16 will be inflated prior to the inflation gas proceeding back down around the front side of the unfilled region 110 to inflate the forwardmost portion of the cushion lower half portion 20 of cushion 16. In FIGS. 13 and 17, there is no such wall to separate the inflation gas entering at inlet 34 so that the inflation gas can immediately proceed around both sides of the unfilled portion 110 to accomplish the simultaneous inflation of the entire cushion 16. In FIGS. 14 and 18, a line of stitching or sealant 154 is provided that proceeds somewhat forwardly from, and part way around the unfilled region 110, to permit a partial filling of the lowermost portion of the cushion 16 below the filled unfilled region 110, while restricting the filling of the forwardmost portion of the cushion 16 to gas from a gas path above unfilled region 110. By choosing among the options of FIGS. 12, 13, and 14, we have found that the inflation of the cushion can be tuned to provide optimal restraint and interaction with a vehicle armrest adjacent the cushion lower portion 20 and with the inboard arm of the occupant.

Some additional alternatives are also possible. The cushion described herein is made of separate panels that are attached with silicone beads and sewing. As an alternative, portions, or all of the cushion 16, and could be fabricated by weaving. The cushion 16 is also configured so that the cushion lower half portion 20 deploys adjacent the center console 12. The cushion 16 may also be shaped so that the lower portion 20 deploys above the center console 12. Finally, the sealant 32, 38, 48, 50, 58 can be applied to the occupant facing panel 26 instead of the opposite facing panel 28 during cushion construction.

What is claimed is:

1. A side impact occupant restraint airbag cushion for mounting on a seat in a motor vehicle and inflating inboard of the occupant, comprising:
    an occupant facing panel and a panel opposite the occupant facing panel,
    a mounting portion mounted on the seat back,
    a cushion upper half portion for positioning inboard the occupant head,
    a cushion lower half lower portion for positioning inboard the occupant torso and having a central unfilled region surrounded by a tubular inflated ring that extends outboard toward the side of the occupant torso from the central unfilled region,
    said cushion upper half portion having a tubular inflated pillow region that extends outboard toward the side of the occupant head further than the tubular inflated ring surrounding the central unfilled region, to thereby provide an enlarged pillow surface for supporting the side of the occupant head upon side impact.

2. The cushion of claim 1 further comprising the enlarged pillow surface having a bulbous ellipsoidal shape.

3. The cushion of claim 1 further comprising the size and shape of the enlarged pillow surface being provided by first and second unfilled regions defined by first and second encirclements of attachments provided between the occupant facing panel and the panel opposite the occupant facing panel.

4. The cushion of claim 3 further comprising the attachments being stitches, adhesive, or a combination of stitches and adhesive.

5. The cushion of claim 3 further comprising the encirclements of attachments being of round or oblong shape.

6. The cushion of claim 3 further comprising a row of attachments extending between the first and second encirclements to further define the enlarged pillow region.

7. The cushion of claim 6 further comprising the row of attachments extending in either a generally straight line path between the first and second encirclements, or in a concave downwardly extending path, or a convex upwardly extending path between the first and second encirclements.

8. The cushion of claim 1 further comprising an upper tether having a lower anchored end and an upper end attached to the cushion upper half portion and overlying the enlarged pillow surface so that the tether is shorter in length than the cushion to rotate the cushion upper half portion toward the occupant head.

9. The cushion of claim 1 further comprising a lower tether having a rear anchored end and a forward end attached to the cushion lower half portion so that the lower tether restrains the cushion lower half portion against bending away from the occupant.

10. The cushion of claim 1 further comprising an upper tether having a lower anchored end and an upper end attached to the cushion upper half portion and overlying the enlarged pillow surface so that the tether is contacted by the occupant head, and lower tether having a rear anchored end a forward end attached to the cushion lower half portion, so that the upper and lower tethers respectively restrain the cushion upper half portion and the cushion lower half portion against bending away from the occupant.

11. A side impact occupant restraint airbag cushion for mounting on a seat in a motor vehicle and inflating inboard of the occupant, comprising:
   an occupant facing panel and a panel opposite the occupant facing panel,
   a mounting portion mounted on the seat back,
   a cushion upper half portion for positioning inboard the side of the occupant head and having a peripheral edge above and forward of the side of the occupant head and a pillow surface inboard the side of the occupant head,
   a cushion lower half lower portion for positioning inboard the occupant torso,
   and an upper tether having a lower end anchored to the seat back and an upper end attached to the peripheral edge of the cushion upper half portion at the side of the occupant head, said upper tether overlying the pillow surface inboard of the side of the occupant head and being shorter in length than the cushion so that the tether rotates the cushion upper half portion inboard toward the side of the occupant head and restrains the cushion upper half portion against bending away from the occupant.

12. The cushion of claim 11 further comprising the cushion lower half portion having a central unfilled region surrounded by a tubular inflated ring that extends toward the occupant from the central unfilled region.

13. The cushion of claim 11 further comprising the upper half portion having a tubular inflated pillow region that extends toward the occupant further than the cushion lower half portion to thereby provide an enlarged pillow surface for supporting the upper end of the upper tether.

14. The cushion of claim 13 further comprising the size and shape of the enlarged pillow region being provided by first and second unfilled regions defined by first and second encirclements of attachments provided between the occupant facing panel and the panel opposite the occupant facing panel, and the upper tether overlying the enlarged pillow surface so that the enlarged pillow surface supports the upper tether and the upper tether in turn contacts with the side of the occupant head during occupant restraint, and the upper tether at least partially covers one of the first and second unfilled regions and acts a taut membrane to limit lateral penetration of the side of the occupant head into the first and second unfilled regions.

15. The cushion of claim 13 further comprising a secondary pillow surface provided below the enlarged pillow surface to provide supplemental support to the tether.

16. The cushion of claim 14 further comprising a row of attachments extending between the first and second encirclements to further define the enlarged pillow region and pillow surface.

17. The cushion of claim 11 further comprising a lower tether having a rear anchored end and a forward end attached to the cushion lower half portion so that the lower tether restrains the cushion lower half portion against bending away from the occupant.

18. The cushion of claim 11 further comprising the upper tether extending diagonally between the upper end and lower end, and the lower end being anchored to the seat back below an occupant shoulder.

19. The cushion of claim 11 further comprising the upper half portion having a tubular inflated pillow region that extends toward the occupant further than the cushion lower half portion to thereby provide an enlarged pillow surface for supporting the occupant head.

20. A side impact occupant restraint airbag cushion for mounting on a seat in a motor vehicle and inflating inboard of the occupant, comprising:
   an occupant facing panel and a panel opposite the occupant facing panel,
   a mounting portion mounted on the seat back,
   a cushion upper half portion for positioning inboard the occupant head,
   a cushion lower half lower portion for positioning inboard the occupant torso and having a central unfilled region surrounded by a tubular inflated ring that extends outboard toward the side of the occupant torso from the central unfilled region,
   said cushion upper half portion having a tubular inflated pillow region that extends outboard toward the side of the occupant head further than the tubular inflated ring surrounding the central unfilled region, to thereby provide an enlarged pillow surface for supporting the side of the occupant head upon side impact,
   and an upper tether having a lower end anchored to the seat back and an upper end attached to the peripheral edge of the cushion upper half portion above and forward the side of the occupant head, said upper tether overlying the enlarged pillow surface and being shorter in length than the cushion so that upon contact with the side of the occupant head the tether rotates the cushion upper half portion inboard toward the side of the occupant head and restrains the cushion upper half portion against bending away from the occupant.

* * * * *